United States Patent
Boyazis

(10) Patent No.: US 10,253,907 B2
(45) Date of Patent: Apr. 9, 2019

(54) PENETRATING FIXTURE AND FIBERGLASS SUMP

(71) Applicant: AEP International, Inc., Jacksonville, FL (US)

(72) Inventor: Georges Boyazis, Jacksonville, FL (US)

(73) Assignee: AEP International, Inc., Jacksonville, FL (US)

( * ) Notice: Subject to any disclaimer, the term of this patent is extended or adjusted under 35 U.S.C. 154(b) by 0 days.

(21) Appl. No.: 15/576,478

(22) PCT Filed: Feb. 16, 2017

(86) PCT No.: PCT/US2017/018108
§ 371 (c)(1),
(2) Date: Nov. 22, 2017

(87) PCT Pub. No.: WO2017/143019
PCT Pub. Date: Aug. 24, 2017

(65) Prior Publication Data
US 2018/0156363 A1    Jun. 7, 2018

Related U.S. Application Data

(60) Provisional application No. 62/295,948, filed on Feb. 16, 2016.

(51) Int. Cl.
| | |
|---|---|
| *F16L 5/10* | (2006.01) |
| *F16L 47/20* | (2006.01) |
| *B29C 65/48* | (2006.01) |
| *B29C 65/00* | (2006.01) |
| *F16L 47/02* | (2006.01) |

(Continued)

(52) U.S. Cl.
CPC .............. *F16L 5/10* (2013.01); *B29C 65/483* (2013.01); *B29C 66/026* (2013.01); *B29C 66/532* (2013.01); *B29C 66/71* (2013.01); *B29C 66/7465* (2013.01); *F16L 47/02* (2013.01); *F16L 47/20* (2013.01); *B29C 66/112* (2013.01); *B29C 66/114* (2013.01); *B29C 66/522* (2013.01); *B29C 66/7212* (2013.01); *B29L 2023/22* (2013.01); *B29L 2031/712* (2013.01)

(58) Field of Classification Search
CPC .............. F16L 5/10; F16L 47/02; F16L 47/20
See application file for complete search history.

(56) References Cited

U.S. PATENT DOCUMENTS 5,527,130 A * 6/1996 Webb ........................ B67D 7/78
                                                                                    405/129.55
5,792,528 A    8/1998 Carstens et al.
(Continued)

*Primary Examiner* — James M Hewitt, II
(74) *Attorney, Agent, or Firm* — Christopher Paradies; Paradies Law P.A.

(57) ABSTRACT

A fluorine gas functionalized surface of a fixture is chemically bonded to a fiberglass sump using a resin. The resin chemically reacts with the functionalized surface creating a strong, chemical bond between the fixture, which penetrates the shell of the sump, and the fiberglass shell of the sump. For example, the surface of the fixture is functionalized by a fluorine-containing gas mixture in an autoclave at a temperature, pressure and duration that creates C═O double bonds at the surface of a polyethylene fixture. The resin chemically reacts with the C═O double bonds and bonds with a fiberglass transition fitting capable of being joined to the shell of the sump.

20 Claims, 4 Drawing Sheets

(51) Int. Cl.
   *B29L 31/00*       (2006.01)
   *B29L 23/00*       (2006.01)

(56)              References Cited

U.S. PATENT DOCUMENTS

| | | | |
|---|---|---|---|
| 6,123,365 A * | 9/2000 | Lamping | F16L 5/10 |
| | | | 285/139.2 |
| 7,089,952 B2 | 8/2006 | Nakamura et al. | |
| 9,068,673 B2 | 6/2015 | Mukai et al. | |
| 2004/0189004 A1* | 9/2004 | Wright | F16L 5/02 |
| | | | 285/189 |
| 2005/0029802 A1* | 2/2005 | Boudry | F16L 5/022 |
| | | | 285/21.2 |
| 2007/0057504 A1* | 3/2007 | Boudry | F16L 5/022 |
| | | | 285/136.1 |
| 2008/0246276 A1 | 10/2008 | Bravo et al. | |
| 2009/0136286 A1* | 5/2009 | Kenney | F16L 5/02 |
| | | | 403/51 |

* cited by examiner

PENETRATING FIXTURE AND FIBERGLASS SUMP

CROSS RELATED APPLICATIONS

This application is a 371 U.S. national phase of International Application PCT/US2017/018108 filed Feb. 16, 2017 which claims the benefit of U.S. Provisional Appl. No. 62/295,948, having the same title, and filed Feb. 16, 2016, the entirety of which is hereby incorporated by reference.

FIELD OF THE INVENTION

The field relates to petroleum sumps and piping for transport and delivery of petroleum products, such as diesel and gasoline from tanks to pumps.

BACKGROUND

Ethylene has two carbon atoms bonded to each other with a double bond. Two hydrogen atoms are bonded to each carbon. When polymerizing, the double bond is broken, and new sigma bond between two carbons of two ethylene molecules takes place. In other words, polyethylene is produced by an addition reaction of the monomer ethylene. Its repeating unit is —CH2-CH2-. Thus, this has a very simple structure with long chain carbon atoms. Polyethylene is used for pipes that carry petroleum products, such as gasoline and diesel.

Joining polyethylene pipes to fiberglass sumps is difficult. Over time, any joint between fiberglass and polyethylene tends to leak. Since the purpose of the sump is to prevent leaking, a better solution is needed to prevent leaking where polyethylene piping passes through the wall of a fiberglass sump.

SUMMARY

One example of a petroleum sump fitting for a fiberglass sump connecting to a polyethylene or polypropylene pipe of a petroleum piping system comprises a fiberglass transition fitting having a wall made of at least one layer of fiberglass cloth and a fiberglass resin, the wall defining a through hole, the transition fitting having a sump attachment surface having a surface curvature selected to conform to a shell of the fiberglass sump, such that the transition fitting is capable of being sealingly joined to the shell of the fiberglass sump; and a fixture having a tubular wall, the tubular wall of the fixture being comprised of a polyethylene or polypropylene tube, defined by an outer surface and an inner surface, the inner surface defining a tubular hole passing entirely through the fixture, and the outer surface of the tubular wall of the fixture is functionally fluorinated and is joined to the wall of the shell by an adhesive resin chemically reacted with the functionally fluorinated surface of the fixture, such that the outer wall of the fixture is chemically bonded to the adhesive resin and the adhesive resin is bonded to the fiberglass resin of the wall of the transition fitting, resulting in a sealed joint between the fixture and the wall of the transition fitting, whereby the polyethylene or polypropylene pipe of a petroleum piping system, when inserted into the tubular hole of the fixture or through the tubular hole of the fixture, is capable of being spliced onto the fixture, in the field. For example, the surface curvature of the attachment surface is arcuate, and the curvature of the arcuate attachment surface is selected to conform to an outer surface of the shell of the fiberglass sump, wherein the outer surface of the shell is circular. Alternatively, the surface curvature of the attachment surface is planar, and the attachment surface of the sump fitting is selected to mate with a planar surface of the shell of the sump.

The fixture may be of a polyethylene, and the pipe of the piping system may be made of a polyethylene, either the same polyethylene or another, compatible polyethylene. The polyethylene materials may be joined in the field, such as by heating the two materials, which is referred to as heat fusion bonding or heat fusion welding. The surface of the fixture may be functionalized by converting the surface to a layer with double bond oxygen atoms bonded to carbon atoms. For example, the adhesive resin may be selected from the group of adhesive resins that break one of the bonds of the double bond oxygen atoms bonded to carbon atoms in the polyethylene or polypropylene of the fixture, such as an epoxy resin 127—low viscosity. For example, the fixture is made of a high density polyethylene that substantially resists degradation by petroleum products. The polyethylene or polypropylene pipe of the piping system may be passed through the tubular hole of the fixture and may be bonded onto the fixture. For example, the pipe is fused onto the fixture using heat.

A method of manufacturing the petroleum sump fitting may comprising the following steps: preparing the surface of the fixture for surface fluorination; placing the fixture in an autoclave; evacuating the autoclave; flushing any residual atmospheric gases and humidity with a dry gas; introducing a fluorine-containing gas into the autoclave at a gas pressure, reaction temperature and for a time necessary to functionalize the outer surface of the fixture resulting in fluorination of the outer surface of the fixture; removing the fluorine-containing gas; carefully handling the fixture to avoid degradation of fluorination of the outer surface prior to chemically bonding the fixture to the fiberglass sump fitting; inserting the fixture through the through hole defined by the wall of the sump fitting; after fluorination of the outer surface of the fixture, applying a resin to the outer surface of the fixture, the wall of the sump fitting, or both thereof, wherein the resin applied during this step of applying is chosen to chemically react with the functionalized outer surface of the fixture, chemically bonding the functionalized surface of the fixture and the resin applied during this step of applying; and chemically bonding the resin of the fiberglass sump fitting to the surface of the fixture, following curing of the resin applied during the step of applying. For example, the fluorine-containing gas comprises 20% fluorine and 21% oxygen. The fluorine-containing gas may comprise an inert gas that makes up the balance of the gas mixture. For example, the inert gas is dry nitrogen. The fluorine-containing gas may react with the surface of the fixture for 2 hours at a temperature of 150 degrees Fahrenheit, for example. A pressure of 0.6 atmospheres of the fluorine-containing gas mixture may be introduced into an evacuated autoclave. In one example, a polyethylene or polypropylene pipe of the piping system may be spliced onto an end of the fixture or entirely through the tubular hole of the fixture, before bonding the polyethylene or polypropylene pipe and the fixture. For example, the fixture is of a polyethylene, and the pipe of the piping system is of polyethylene, and the step of bonding comprises heat fusion bonding the polyethylene materials together, sealing the joint between the fixture and the pipe.

In one example, a petroleum pipe system comprises a pipe for transferring petroleum through the pipe, the pipe being made of a polyethylene or polypropylene; a fiberglass sump for containing petroleum spills, the sump comprising a fiberglass shell; and a sump fitting. The sump fitting may comprise any of the examples of sump fittings described herein.

One example of a petroleum sump comprises a fiberglass shell having a wall made of at least one layer of fiberglass cloth and a fiberglass resin, the wall having a through hole; and a fixture having an outer wall and an inner wall defining a tubular hole passing through the fixture, the fixture being comprised of a polyethylene or polypropylene and extending through the wall of the shell, and a surface of the outer wall of the fixture is functionally fluorinated and is joined to the wall of the shell by an adhesive resin that chemically reacts with the functionally fluorinated surface of the fixture, such that the outer wall of the fixture is chemically bonded to the adhesive resin and the adhesive resin is bonded to the fiberglass resin of the wall of the fiberglass shell, resulting in a sealed joint between the fixture and the wall of the fiberglass shell, such that a polyethylene or polypropylene piping system is capable of being spliced onto the fixture in the field. For example, the sealed joint between the fixture and the wall of the shell may be stronger than the strength of the shell, following curing of the adhesive, due to the strong covalent bonding between fixture and the chemically bonded resins.

For example, the sump may be used with a polyethylene or polypropylene piping system, the material of the fixture being selected to be compatible with the piping system. Thus, the piping system may be joined to the fixture, such as by heat fusion bonding of a pipe of the piping system to the fixture.

For example, the surface of the fixture is functionalized by converting the surface to a layer with double bond oxygen atoms bonded to carbon atoms in the polyethylene or polypropylene of the fixture. The adhesive resin may be selected from the group of adhesive resins that break one of the bonds of the double bond oxygen atoms bonded to carbon atoms in the polyethylene or polypropylene of the fixture. For example, the adhesive resin may be an epoxy resin 127—low viscosity, wherein the adhesive resin may be allowed to cure prior to installing the fiberglass sump in the field. For example, curing may take place under controlled conditions, with clamping and positive pressure. A fixture may be made of a high density polyethylene, for example, resulting in a sump and piping system that is capable of withstanding settling and resistant to petroleum products. The fixture may be made of a material such that a polyethylene or polypropylene pipe of the piping system may be spliced onto an end the fixture. In one example, a polyethylene or polypropylene pipe of the piping system is passed through the tubular hole through the fixture and is bonded onto the fixture. For example, the pipe may be fused onto the fixture using heat, such as heat fusion bonding of polyethylene.

A method of installing and/or manufacturing of the petroleum sump may comprise cleaning the surface of the fixture; preparing the surface of the fixture for surface fluorination; placing the fixture in an autoclave; evacuating the autoclave; flushing any residual atmospheric gases and humidity with a dry gas; and introducing a fluorine-containing gas into the autoclave at a gas pressure, reaction temperature and for a time necessary to functionalize the surface of the fixture; removing the fluorine-containing gas; carefully removing the fixture to avoid any degradation of the fluorinated surface prior to bonding the fixture in the fiberglass sump; inserting the fixture through the through hole in the wall of the shell; and applying a resin to the surface of the functionalized surface of the fixture, the fiberglass shell, or both thereof, wherein the resin applied during this step of applying is chosen to chemically react with the functionalized surface of the fixture, chemically bonding the functionalized surface of the fixture to the resin applied during this step of applying and chemically bonding the resin of the fiberglass sump to the surface of the fixture, following curing of the resin. For example, a fluorine-containing gas may comprise 20% fluorine and 21% oxygen. The fluorine-containing gas may comprise an inert gas that makes up the balance of the gas mixture, such as nitrogen.

For example, the fluorine-containing gas reacts with the surface of the fixture for 2 hours at a temperature of 150 degrees Fahrenheit. In one example, 0.6 atmospheres of the fluorine-containing gas mixture are introduced into the autoclave after the step of evacuating the autoclave.

For example, after the adhesive resin is cured and the fixture is chemically bonded within the sump, the process of installation of a piping system may proceed by splicing a polyethylene or polypropylene pipe of the piping system onto an end the fixture, or by passing a polyethylene or polypropylene pipe of the piping system through the tubular hole of the fixture and bonding the polyethylene or polypropylene pipe and the fixture, for example. If the fixture is made of a polyethylene, and the pipe of the piping system is of polyethylene, then the step of bonding may comprise heat fusion bonding, for example.

In one method, a surface of a polyethylene fixture is cleaned and prepped for surface fluorination, as known in the art. The fixture may be placed in an autoclave, for example. The autoclave is evacuated and may be flushed of any residual atmospheric gases and humidity with a dry gas, such as nitrogen. In one example, a fluorine-containing gas is introduced into the autoclave at a gas pressure, reaction temperature and for a time necessary to functionalize the surface of the fixture. The fluorine-containing gas is then removed and the fixture is carefully handled to avoid any degradation of the fluorinated surface prior to bonding the fixture in the fiberglass sump. The fixture is inserted through a through hole in the shell of the sump. A resin is applied to the surface of the functionalized surface of the fixture, the fiberglass shell, or both thereof. The resin is chosen to chemically react with the functionalized surface, chemically bonding the functionalized surface of the fixture to the fiberglass sump following curing of the resin.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

Figure 1:
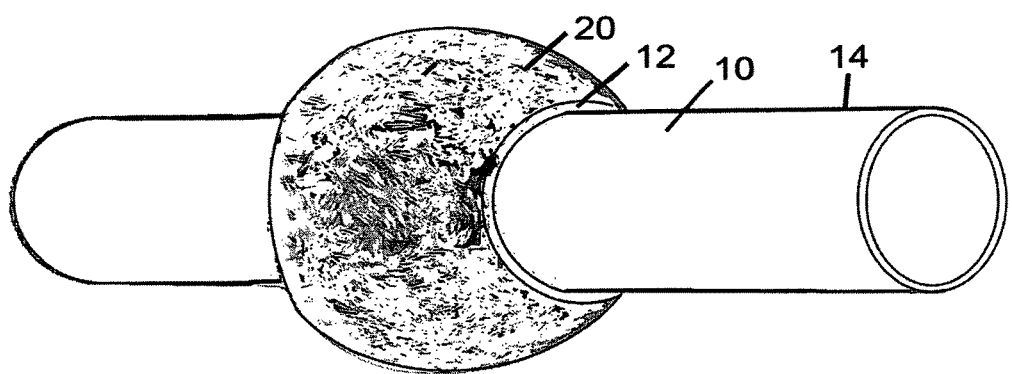
FIG. 1 illustrates an example of a fixture.

In one example, a fixture has a functionalized surface that is chemically bonded to a fiberglass shell of a sump. For example, a surface may be functionalized by fluorination of the polyethylene portion of a fixture. Dilute fluorine gas mixtures may be used to functionalize a surface that creates a strong chemical bond between a fixture, such as a fixture made of a polymer, such as polyethylene or polypropylene or the like, and a fiberglass sump.

In one example, fluorination of a polyethylene fixture is achieved in an autoclave or other reaction vessel. Air is evacuated from the vessel and a functionalization gas is introduced at a pressure and temperature for functionalizing a clean surface of the fixture. For example, the gas mixture may comprise dilute fluorine, with other gases making up the balance of the gas mixture. By exposing the surface for a functionalization time, at the reaction temperature and pressure, free radicals are created on the surface. The free radicals may be reacted with oxygen in the gas mixture or as a gas introduced later. For example, the surface of a polyethylene fixture is functionalized by converting a surface layer to a layer with double bond oxygen atoms bonded to the carbon atoms in a polyethylene or polypropylene chain. A resin is selected that breaks one of the C=O double bonds and forms a chemical bond between the resin and the polymer surface. This chemical bonding makes the interface exceedingly robust, resisting cracking and leaking. The functionalized surface is stable, giving sufficient time to apply the resin adhesive and for joining the fixture to the sump. Alternatives, such as flame oxidizing, mechanical abrasion, applying a fiberglass matting or adhesive resins applied without the step of fluorination fail to achieve a degree of bonding similar to the fluorination of the polymer surface.

In one example, an epoxy resin 127—low viscosity, which is manufactured by Raka, Inc. is used for bonding the functionalized polymer surface created by the step of fluorination to the fiberglass sump. Care must be taken to avoid touching or otherwise contaminating or degrading the functionalized surface prior to adhering the fixture in place using this epoxy resin. In one example, penetrating fixtures are functionalized with a fluorine-containing gas and are bonded securely in a through-hole of a fiberglass sump in a clean environment, using a compatible epoxy resin. The epoxy resin may be allowed to cure prior to installing the fiberglass sump in the field. Every other solution eventually fails in the field, but the chemically bonded joint created between the fluorine-functionalized surface and the fiberglass sump shell does not fail, if care is taken to not allow a freshly functionalized polymer surface to be contaminated or degraded. Only resins that break the C=O bonds and create chemical bonding between the resin and the functionalized polymer surface create adequate bonding between the fixture and the sump. Of course, the resin must be compatible with the fiberglass material, also. In addition, the resin must resist degradation by petroleum products, as well. Some resins that were tested were not suitable for this purpose.

In one method, a gas mixture is introduced into an autoclave containing a cleaned and prepped polyethylene fixture that is to be used as a fixture penetrating a wall of a fiberglass sump. The gas mixture comprises 20% fluorine, 21% oxygen and nitrogen, for example. The nitrogen is inert and can make up the balance. The gas reacts with the surface of the fixture for 2 hours at 150 degrees Fahrenheit, for example. In one example, the autoclave is evacuated and 0.6 atmospheres of the fluorine-containing gas mixture is introduced into the autoclave. After the reaction time, the fluorine-containing gas mixture may be evacuated and the autoclave may be flushed. For example, the autoclave may be flushed with air. In one example, the autoclave is flushed with air and the air is evacuated three times before the fluorine functionalized fixture is removed from the autoclave. Then, a compatible resin is applied to the functionalized surface of the fixture, the wall of the sump or both therefore, and the fixture is fixed into position, penetrating the shell of the fiberglass sump. For example, the fixture may be clamped into place or held into place by positive pressure, while the resin, such as an epoxy resin, chemically reacts with the surface and cures.

After the resin is cured (or partially cured) the clamping or positive pressure may be removed and the sump and fixture may be delivered to the field for installation with a compatible piping system. For example, a polyethylene fixture may be used for polyethylene piping, which is known in the art for use in delivering petroleum products from storage tanks using pumps. A sump may be used where petroleum products are added to tanks, removed from tanks or where pumps are located. Any spill or leak is contained by the sump and does not leak through the locations where the fixture penetrates the sump, for example, even if settling or expansion occurs that stresses the joint between fixture and sump.

FIG. 1 illustrates an example of a fixture 10. The fixture 10 comprises a tube with a fluorinated surface 14 bonded by an epoxy resin 12 to a fiberglass entry boot 20. For example, the tube is made of a high density polyethylene. The fluorinated surface 14 is functionalized by a fluorine-containing gas mixture, and the epoxy resin 12 is chemically bonded to C=O double bonds formed on the surface 14 during a step of fluorination. A pipe may be spliced onto one or both ends of the fixture 10 or may passed through the fixture 10 and bonded thereto, for example, during assembly in the field, before or after the fiberglass entry boot 20 is adhesively bonded to a fiberglass sump.

Figure 2:
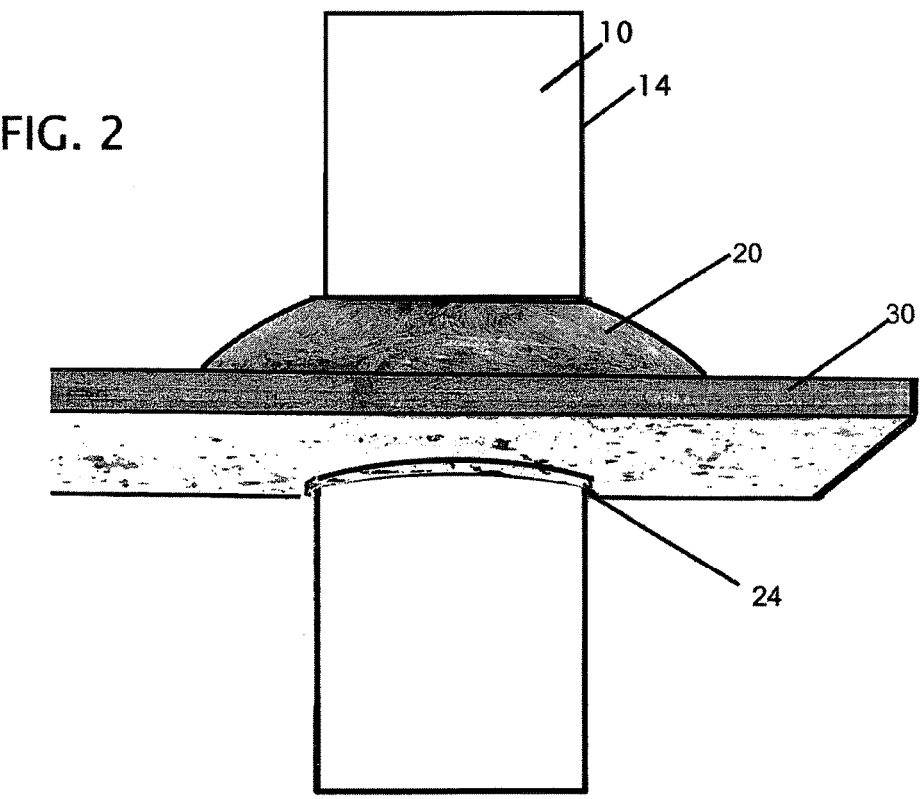
FIG. 2 illustrates another view of a fixture joined to a shell of sump.
Figure 3:
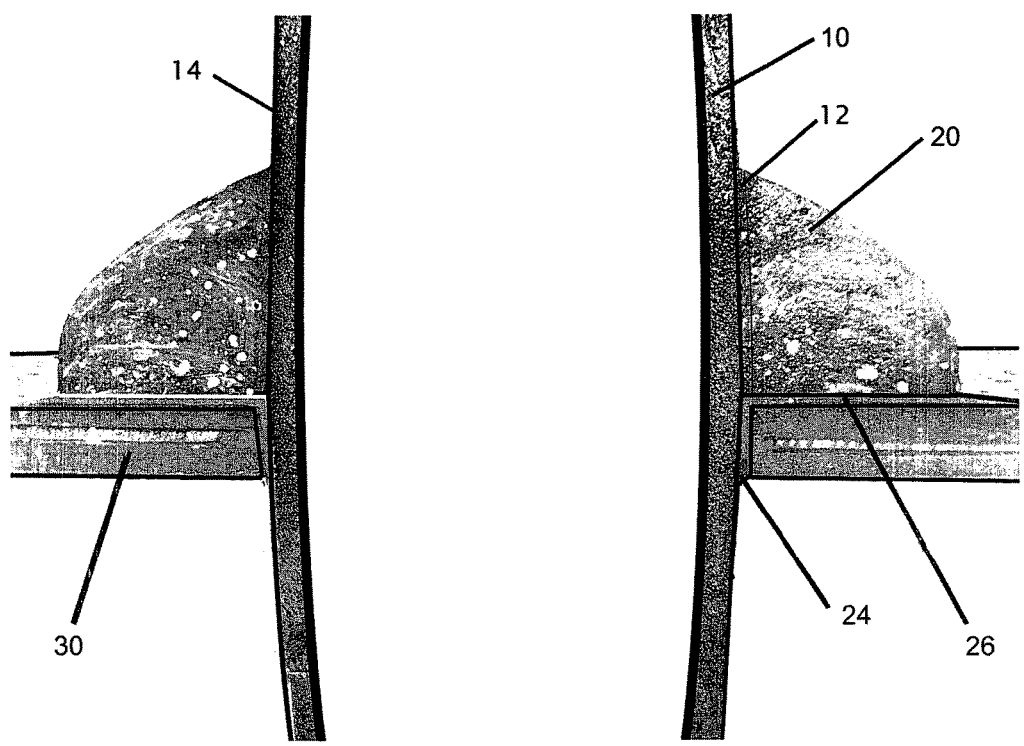
FIG. 3 illustrate a cross sectional, detailed view of a sump wall and fixture polyethylene piping joined to the fixture.

FIG. 2 illustrates a detail view of an entry boot 20 adhesively bonded to a shell 30 of a sump. The fixture 10 passes through a through-hole 24 formed in the shell 30 of the sump. After the fiberglass entry boot 20 is epoxied to the fluorinated surface 14 of the fixture, the fixture 10 may be handled normally. The fiberglass entry boot 20 is quite capable of being bonded adhesively to the fiberglass shell 30 of the sump, and the combined shell 30 and boot 20 make a strong joint at the interface 24, 26, as is known in the art of joining fiberglass, as illustrated in the cross sectional, detailed view of FIG. 3.

Figure 4:
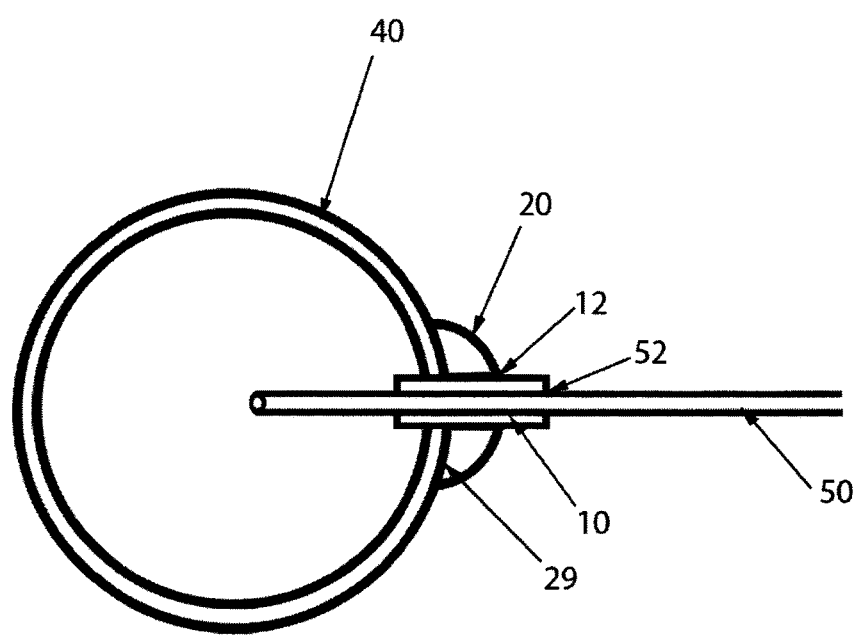
FIG. 4 illustrates an example of a piping system.

FIG. 4 illustrates a sump 40 made of fiberglass for containing petroleum spills, having a polyethylene or polypropylene pipe 50 of a petroleum piping system inserted through the wall of the sump 40. In this example, an example of a sump fitting includes a fiberglass transition fitting 20 with an arcuate attachment surface 29 coupled to an outer surface of the sump 40. The fiberglass transition fitting is comprised of at least one layer of glass fibers as a reinforcing fabric or cloth and a fiberglass resin matrix. The glass fibers may be randomly oriented in one or more layers in the matrix or may be oriented as mats or woven fabrics within the resin matrix, for example. The fixture 10 is joined to the fitting 20 by an adhesive resin layer 12 chemically bonded to a chemically functionalized surface of the polyethylene or polypropylene fixture 10 and chemically bonding and sealing the fitting 20 onto the surface of the fixture 10. For example, the surface may be fluorinated and an adhesive resin applied to the surface that chemically bonds to C=O bonds at the surface during curing of the sump fitting. In this example, the pipe 50 extends entirely through the tubular hole defined by the wall of the fixture 10, and the wall of the fixture 10 and the wall of the pipe 50 are heat fusion bonded 52 along at least a portion of the length of the fixture 10. Dimensions of some features are exaggerated in this schematic illustration for the purpose of visualizing those features.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A petroleum sump fitting for a fiberglass sump connecting to a polyethylene or polypropylene pipe of a petroleum piping system, the sump fitting comprising:
    a fiberglass transition fitting having a wall made of at least one layer of fiberglass cloth and a fiberglass resin, the wall defining a through hole, the transition fitting having a sump attachment surface having a surface curvature or planar surface selected to conform to a shell of the fiberglass sump, such that the transition fitting is capable of being sealingly joined to the shell of the fiberglass sump; and
    a fixture having a tubular wall, the tubular wall of the fixture being comprised of a polyethylene or polypropylene tube, defined by an outer surface and an inner surface, the inner surface defining a tubular hole passing entirely through the fixture, and wherein the outer surface of the tubular wall of the fixture is functionally fluorinated and is joined to the wall of the shell by an adhesive resin chemically reacted with the functionally fluorinated surface of the fixture, such that the outer wall of the fixture is chemically bonded to the adhesive resin and the adhesive resin is bonded to the fiberglass resin of the wall of the transition fitting, resulting in a sealed joint between the fixture and the wall of the transition fitting, whereby the polyethylene or polypropylene pipe of a petroleum piping system, when inserted into the tubular hole of the fixture or through the tubular hole of the fixture, is capable of being spliced onto the fixture, in the field.

2. The sump fitting of claim 1, wherein the surface curvature of the sump attachment surface is arcuate, and the surface curvature of the sump attachment surface is selected to conform to an outer surface of the shell of the fiberglass sump, wherein the outer surface of the shell is circular.

3. The sump fitting of claim 2, wherein the fixture is of a polyethylene, and the pipe of the petroleum piping system is of a polyethylene and is joined to the fixture.

4. The sump fitting of claim 1, wherein the surface of the fixture is functionalized by converting the surface to a layer with double bond oxygen atoms bonded to carbon atoms.

5. The sump fitting of claim 4, wherein the adhesive resin is selected from the group of adhesive resins that break one of the bonds of the double bond oxygen atoms bonded to carbon atoms in the polyethylene or polypropylene of the fixture.

6. The sump fitting of claim 5, wherein the adhesive resin is an epoxy resin 127—low viscosity.

7. The sump of claim 1, wherein the fixture is made of a high density polyethylene.

8. The sump of claim 1, wherein the polyethylene or polypropylene pipe of the petroleum piping system is passed through the tubular hole of the fixture and is bonded onto the fixture.

9. The sump of claim 8, wherein the pipe is fused onto the fixture using heat.

10. The sump fitting of claim 1, wherein the attachment surface is planar, and the attachment surface of the sump fitting is selected to mate with a planar surface of the shell of the sump.

11. A method of manufacturing the petroleum sump fitting of claim 1, comprising:
    preparing the outer surface of the fixture for surface fluorination;
    placing the fixture in an autoclave;
    evacuating the autoclave;
    flushing any residual atmospheric gases and humidity with a dry gas; and
    introducing a fluorine-containing gas into the autoclave at a gas pressure, reaction temperature and for a time necessary to functionalize the outer surface of the fixture resulting in fluorination of the outer surface of the fixture;
    removing the fluorine-containing gas;
    carefully handling the fixture to avoid degradation of fluorination of the outer surface prior to chemically bonding the fixture to the fiberglass sump fitting;
    inserting the fixture through the through hole defined by the wall of the sump fitting; and
    after fluorination of the outer surface of the fixture, applying a resin to the outer surface of the fixture, the wall of the sump fitting, or both thereof, wherein the resin applied during this step of applying is chosen to chemically react with the functionalized outer surface of the fixture, chemically bonding the functionalized outer surface of the fixture and the resin applied during this step of applying; and
    chemically bonding the resin of the fiberglass sump fitting to the surface of the fixture, following curing of the resin applied during the step of applying.

12. The method of claim 11, wherein the fluorine-containing gas comprises 20% fluorine and 21% oxygen.

13. The method of claim 12, wherein the fluorine-containing gas comprises an inert gas that makes up the balance of a gas mixture.

14. The method of claim 13, wherein the inert gas is nitrogen.

15. The method of claim 11, wherein the fluorine-containing gas reacts with the surface of the fixture for 2 hours at a temperature of 150 degrees Fahrenheit.

16. The method of claim 15, wherein 0.6 atmospheres of the fluorine-containing gas mixture are introduced into the autoclave after the step of evacuating the autoclave.

17. The method of claim 11, further comprising splicing a polyethylene or polypropylene pipe of the piping system onto an end the fixture.

18. The method of claim 11, further comprising passing a polyethylene or polypropylene pipe of the petroleum piping system through the tubular hole of the fixture and bonding the polyethylene or polypropylene pipe and the fixture.

19. The method of claim 18, wherein the fixture is made of a polyethylene, and the petroleum pipe of the piping system is of polyethylene, and the step of bonding comprises heat fusion bonding of the polyethylene pipe and the polyethylene fixture.

20. A petroleum pipe system comprising:
    a pipe for transferring petroleum through the pipe, the pipe being made of a polyethylene or polypropylene;
    a fiberglass sump for containing petroleum spills, the sump comprising a fiberglass shell; and
    a sump fitting, the sump fitting comprising:
        a fiberglass transition fitting having a wall made of at least one layer of fiberglass cloth and a fiberglass resin, the wall defining a through hole, the transition fitting having a sump attachment surface having a surface curvature selected to conform to the shell of the sump, such that the transition fitting is capable of being sealingly joined to the shell of the fiberglass sump; and a fixture having a tubular wall, the tubular wall of the fixture being comprised of a polyethylene or polypropylene tube, defined by an outer surface and an inner surface, the inner surface defining a tubular hole passing entirely through the fixture, and the outer surface of the tubular wall of the fixture is functionally fluorinated and is joined to the shell by an adhesive resin chemically reacted with the functionally fluorinated outer surface of the fixture, such that the tubular wall of the fixture is chemically bonded to the adhesive resin and the adhesive resin is bonded to the fiberglass resin of the wall of the transition fitting, resulting in a sealed joint between the fixture and the wall of the transition fitting, such that the pipe, when inserted into the tubular hole of the fixture or through the tubular hole of the fixture, is spliced onto the fixture, in the field.

\* \* \* \* \*